Nov. 10, 1936.   W. SCHNEIDER   2,060,383
SENSITIZED SILVER HALIDE EMULSIONS
Filed March 16, 1933
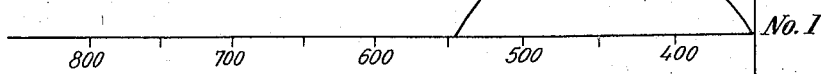
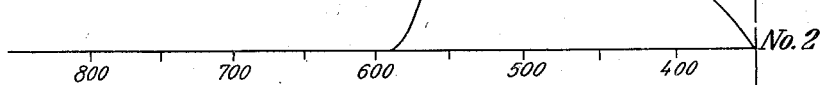
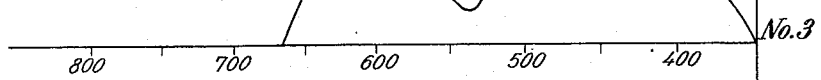
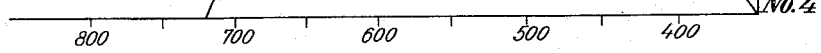
Inventor:
Wilhelm Schneider,
By Attorney
Philip S. Hopkins.

Patented Nov. 10, 1936

2,060,383

UNITED STATES PATENT OFFICE 2,060,383

SENSITIZED SILVER HALIDE EMULSIONS

Wilhelm Schneider, Dessau in Anhalt, Germany, assignor to Agfa Ansco Corporation, Binghamton, N. Y., a corporation of New York Application March 16, 1933, Serial No. 661,187
In Germany March 18, 1932

11 Claims. (Cl. 95—7)

My present invention relates to sensitizing of photographic emulsions.

One of its objects is to provide such an emulsion the sensitivity of which is raised over the range of wave lengths to which the emulsion is normally sensitive. Further objects will be seen from the detailed specification following hereafter. Reference is made to the accompanying drawing showing some spectograms of emulsions sensitized according to applicant's present invention.

I have found that dyestuffs of the polymethine series which are substituted at the central carbon atom of the polymethine chain by a thienyl group are powerful sensitizers for photographic silver halide emulsions and particularly for silver halide gelatin emulsions.

The manufacture of these dyestuffs has been described in my copending application Ser. No. 661,185 filed March 16, 1933. They correspond, for instance, with the following formula

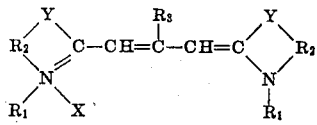

wherein $R_1$ stands for alkyl or aryl, $R_2$ stands for vinylene, phenylene, naphthylene, and so on, $R_3$ stands for thienyl or a substituted thienyl, Y stands for

oxygen, sulfur, selenium, X stands for Cl, Br, I, $SO_4CH_3$, $ClO_4$ or another acid radical.

The dyes are obtainable according to the desired solubility in form of the bromide, iodide, perchlorate etc. and are used in a quantity, such as is usual for the known sensitizing dyes. This quantity may amount to about 15 to 30 milligrams per kilo of emulsion ready for being cast which contains about 9 per cent of gelatin, 4.5 per cent of silver halide and the rest water. However, the invention is not limited to the quantities just indicated and the most suitable amount can be found in each case by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production; however, they are preferably added to the finished emulsion before casting.

The dyes may likewise be incorporated in the emulsion by coating or bathing the finished photographic material in a bath in which the dye is dissolved. Such a treatment may be as follows:—The photographic material to be sensitized is bathed in a solution containing 1 milligram of bis-[3-ethyl-naphtho-2',1'-4.5-thiazole-(2)]-β-thienyl-trimethine-cyanine bromide in 50 to 100 cc. of an aqueous solution of methanol of 50 per cent strength. The material is then dried, whereupon it is ready for use.

The incorporation of the sensitizer by coating may be effected by applying to the emulsion which has been cast but is not yet dry a solution of the sensitizer of suitable concentration by means of a coating roller. The concentration depends, of course, on the speed of the coating roller. If the peripheral speed of the coating roller is 20 cm. per second a solution containing 1 milligram of sensitizer in about 100 cc. of an aqueous solution of methanol of 50 per cent strength may do.

The accompanying drawing shows some spectrograms of emulsions sensitized according to applicant's present invention in comparison with an unsensitized emulsion.

No. 1 shows the spectrogram of a silver bromide emulsion containing about 4 per cent of silver iodide.

No. 2 shows a spectrogram of the same emulsion sensitized with bis-[3-ethyl-benzoxazole-(2)]-β thienyl-trimethine-cyanine iodide.

No. 3 shows a spectrogram of the same emulsion sensitized with bis-[3-ethyl-naphtho-2',1'-4.5-thiazole-(2)]-β-thienyl-trimethine-cyanine bromide.

No. 4 shows a spectrogram of the same emulsion sensitizied with bis-[3-ethyl-benzselenazole-(2)]-β-thienyl-trimethine-cyanine bromide.

The following examples serve to illustrate the invention:

Example 1.—A gelatino-silver-bromide emulsion containing about 4 per cent of silver iodide sensitized with bis-[3-ethyl-benzoxazole-(2)]-β-thienyl-trimethine-cyanine iodide corresponding with the formula

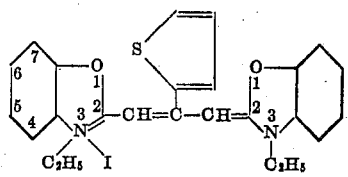

imparts to the same a range of sensitiveness extending to a wave length af about 570μμ with two maxima, one at about 555μμ and the other at about 520μμ. The lower limit of the range of sensitiveness could not be ascertained as it lies in the range of standard sensitiveness of the emulsion.

Example 2.—A gelatino-silver-bromide emulsion containing about 4 per cent of silver iodide sensitized with bis-[3-ethyl-benzthiazole-(2)]-

β-thienyl-trimethine-cyanine bromide corresponding with the formula

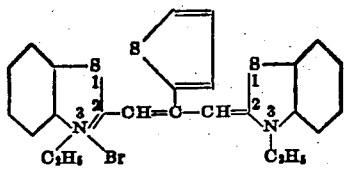

imparts to the same a range of sensitiveness extending to a wave length from about 530μμ to about 670μμ with two maxima, one at about 645μμ and the other at about 600μμ.

*Example 3.*—A gelatino-silver-bromide emulsion containing about 4 per cent of silver iodide sensitized with bis-[3-ethyl-naphtho-2'.1'-4.5-thiazole-(2)]-β-thienyl-trimethine-cyanine bromide corresponding with the formula.

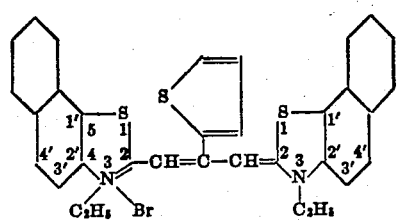

imparts to the same a range of sensitiveness extending to a wave length from about 530μμ to about 720μμ with two maxima, one at about 690μμ and the other at about 650μμ.

*Example 4.*—A gelatino-silver-bromide emulsion containing about 4 per cent of silver iodide sensitized with bis-[3-ethyl-benzselenazole-(2)]-β-thienyl-trimethine-cyanine bromide corresponding with the formula

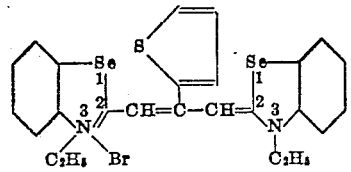

imparts to the same a range of sensitiveness extending to a wave length from about 530μμ to 690μμ with two maxima, one at about 675μμ and the other at about 650μμ.

What I claim is:

1. A photographic material comprising a silver halide emulsion containing a dyestuff corresponding with the formula

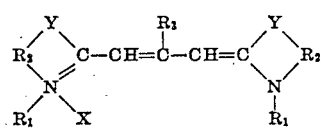

wherein R₁ stands for alkyl or aryl, R₂ stands for vinylene, phenylene or naphthylene, R₃ stands for a thienyl group, Y in both cases stands for either

oxygen, sulfur or selenium and X stands for a dye precipitating anion.

2. A photographic material comprising a silver halide emulsion containing a trimethine-cyanine substituted at the central carbon atom of the trimethenyl chain by a thienyl group.

3. A photographic material comprising a silver halide emulsion containing a bis-[3-alkyl-benzthiazole-(2)]-trimethine cyanine substituted at the central carbon atom by a thienyl group.

4. A photographic material comprising a silver halide emulsion containing a bis-[3-alkyl-benzselenazole-(2)]-trimethine cyanine substituted at the central carbon atom by a thienyl group.

5. A photographic material comprising a gelatino-silver-bromide emulsion containing about 4 per cent of silver iodide sensitized with bis-[3-ethyl-benzoxazole-(2)]-β-thienyl-trimethine-cyanine iodide and having a range of sensitiveness extending to about 570μμ with two maxima, one at about 555μμ and the other at about 520μμ.

6. A photographic material comprising a gelatino-silver-bromide emulsion containing about 4 per cent of silver iodide sensitized with bis-[3-ethyl-naphtho-2'.1'-4.5-thiazole-(2)]-β-thienyl-trimethine-cyanine bromide and having a range of sensitiveness extending from about 530μμ to about 720μμ with two maxima, one at about 690μμ and the other at about 650μμ.

7. A photographic material comprising a gelatino-silver-bromide emulsion containing about 4 per cent of silver iodide sensitized with bis-[3-ethyl-benzselenazole-(2)]-β-thienyl-trimethine-cyanine bromide and having a range of sensitiveness extending from about 530μμ to about 690μμ with two maxima, one at about 675μμ and the other at about 650μμ.

8. A photographic material comprising a silver halide emulsion containing a bis-[3-alkyl-benzoxazole-(2)]-trimethine-cyanine substituted at the central carbon atom by a thienyl group.

9. A photographic material comprising a silver halide emulsion sensitized with bis-[3-ethyl-benzoxazole-(2)]-β-thienyltrimethine-cyanine iodide.

10. A photographic material comprising a silver halide emulsion sensitized with bis-[3-ethyl-naphtho-2'.1'-4.5-thiazole-(2)]-β-thienyl-trimethine-cyanine bromide.

11. A photographic material comprising a silver halide emulsion sensitized with bis-[3-ethyl-benzselenazole-(2)]-β-thienyl-trimethine-cyanine bromide.

WILHELM SCHNEIDER.